Feb. 11, 1930.  J. N. TOOKER ET AL  1,746,623
METHOD OF AND MACHINE FOR USE IN THE MANUFACTURE OF BAGS
Filed Dec. 12, 1927  10 Sheets-Sheet 1

INVENTORS
J. N. Tooker.
J. F. Harley.
BY
ATTORNEYS.

Feb. 11, 1930. J. N. TOOKER ET AL 1,746,623
METHOD OF AND MACHINE FOR USE IN THE MANUFACTURE OF BAGS
Filed Dec. 12, 1927 10 Sheets-Sheet 8

INVENTORS
J. N. Tooker
J. F. Harley
BY Bartlett Brownell
ATTORNEYS

Feb. 11, 1930.   J. N. TOOKER ET AL   1,746,623
METHOD OF AND MACHINE FOR USE IN THE MANUFACTURE OF BAGS
Filed Dec. 12, 1927   10 Sheets-Sheet 10

INVENTORS
J. N. Tooker.
J. F. Harley
BY Bartlett & Brownell
ATTORNEYS.

Patented Feb. 11, 1930

1,746,623

UNITED STATES PATENT OFFICE

JOHN N. TOOKER AND JOHN F. HARLEY, OF CANAJOHARIE, NEW YORK, ASSIGNORS TO ARKELL & SMITHS, OF CANAJOHARIE, NEW YORK, A CORPORATION OF NEW YORK

METHOD OF AND MACHINE FOR USE IN THE MANUFACTURE OF BAGS

Application filed December 12, 1927. Serial No. 239,272.

Our invention relates to a method of manufacturing bags, and further relates to a machine that is particularly adapted for use in carrying out the method.

One of the objects of our invention is to provide a novel and improved method and machine of this character.

Another object of the invention is to provide a machine which is particularly adapted for use in the manufacture of multi-ply paper bags in accordance with our improved method, and which is simple in construction, and efficient and expeditious in operation.

A further object of the present invention is to provide a novel and improved method of and machine for use in the manufacture of multi-ply bags, particularly of the type in which one or more of the inner plies have their ends spaced a distance from the ends of the outer plies, this type of bag being described and claimed in our Patent No. 1,633,296, dated June 21, 1927.

Other objects of the invention and features whereby they may be attained will be clearly understood from the following description and accompanying drawings, in which.

Figure 1:
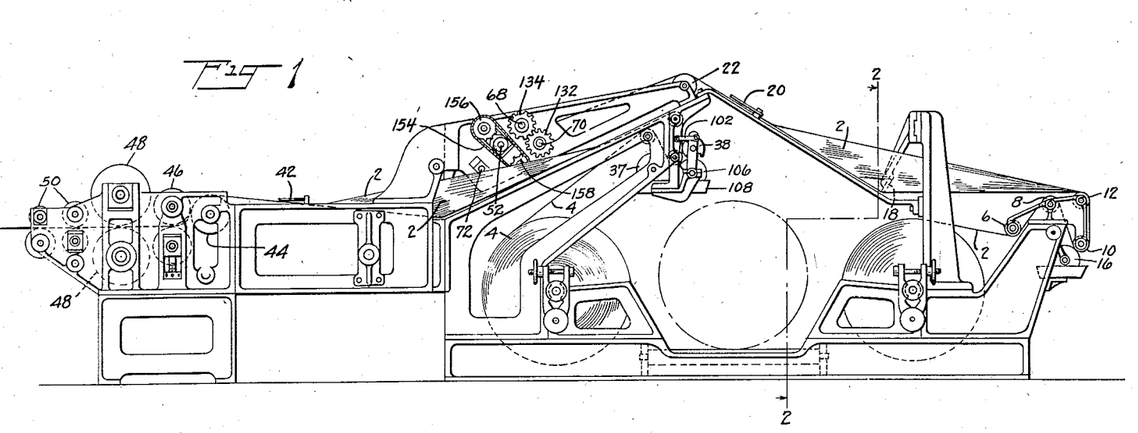
Figure 1 is a right side elevation of our improved machine.
Figure 2:
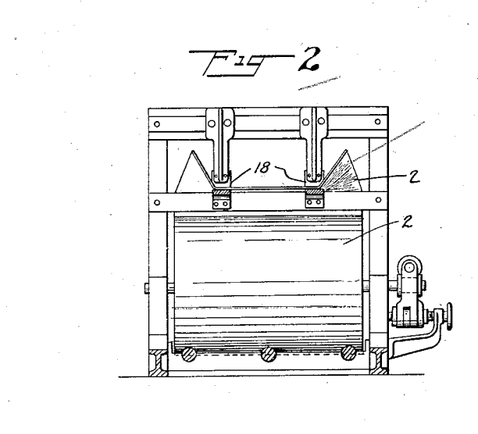
Fig. 2 is a detail sectional view taken on the line 2—2 of Fig. 1.
Figure 3:
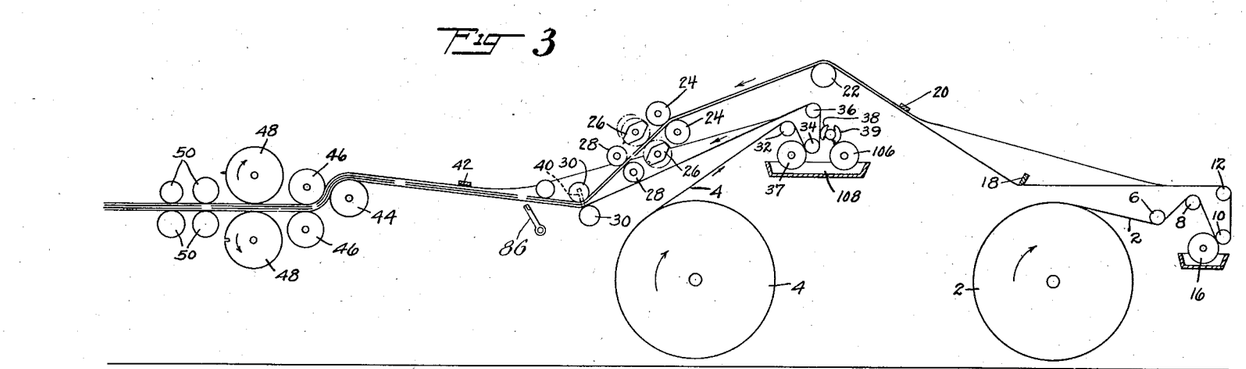
Fig. 3 is a diagrammatical longitudinal sectional view of the machine.

The machine illustrated in the drawings is particularly adapted for use in the manufacture of the multi-ply paper bag disclosed in our said Patent No. 1,633,296, the machine being for the purpose of forming the blank preparatory to the operation thereon of the usual bag bottoming machine, or if desired the ends of the blank may be closed by hand. The illustrated machine is shown in the operation of forming blanks for double-ply bags. As shown, the two plies of the bag are formed from strips 2 and 4 that are supplied to the machine in rolls, the inner ply being formed from the strip 2 and the outer ply from the strip 4 (Figs. 1 and 3). The strip 2 passes from its roll beneath a guide roll 6, over a guide roll 8, beneath a guide roll 10, and then up over a guide roll 12. As it passes under the guide roll 10 a strip of glue 14 (Fig. 4) is applied to its under side adjacent its further edge by means of a suitable glue roll 16.

After leaving the guide roll 12 the strip passes beneath suitable folding devices in the form of shoes 18, which, together with suitable fingers 20, folds the strip longitudinally on lines parallel with its edges so as to form a flat tube, the edges of the strip overlapping and being secured together by the line of glue 14. The strip thus folded passes over a guide roll 22, between pinch or draw rolls 24, cutting-off rolls 26 hereinafter described, and a second pair of draw rolls 28. The tube then passes between guide rolls 30 where it is presented to the outer strip 4.

The strip 4 passes from its roll over a guide roll 32, beneath a guide roll 34, and then up over a guide roll 36. As the strip passes beneath the guide roll 34, a suitable glue roll 37 applies a line of glue 35 (Fig. 4) to its under side adjacent its nearest edge.

While the strip 4 is passing from the guide roll 34 to the guide roll 36 a device, hereinafter described, comprising segments 38 and 39 applies glue at suitable spots on the upper side of the strip so that when the two strips are brought together and the completed blanks are cut off, the two plies will be secured together at points adjacent their ends.

After the strip 4 leaves the guide roll 36 it passes between the guide rolls 30 where it is brought into contact with the tubular inner ply, and folding devices 40, hereinafter described, together with folding fingers 42 fold the outer strip 4 about the tubular inner strip with the edges of the outer strip overlapping and secured together by means of the glue 35, the edges of the outer strip being lapped in the opposite direction from those of the inner strip as shown. The two strips thus folded and assembled are then passed over a draw roll 44, between draw rolls 46, between cutting-off rolls 48, and then passes between suitable draw and soft-tie rolls 50 which discharge the completed bag blanks from the machine.

Figures 6, 7, 8:
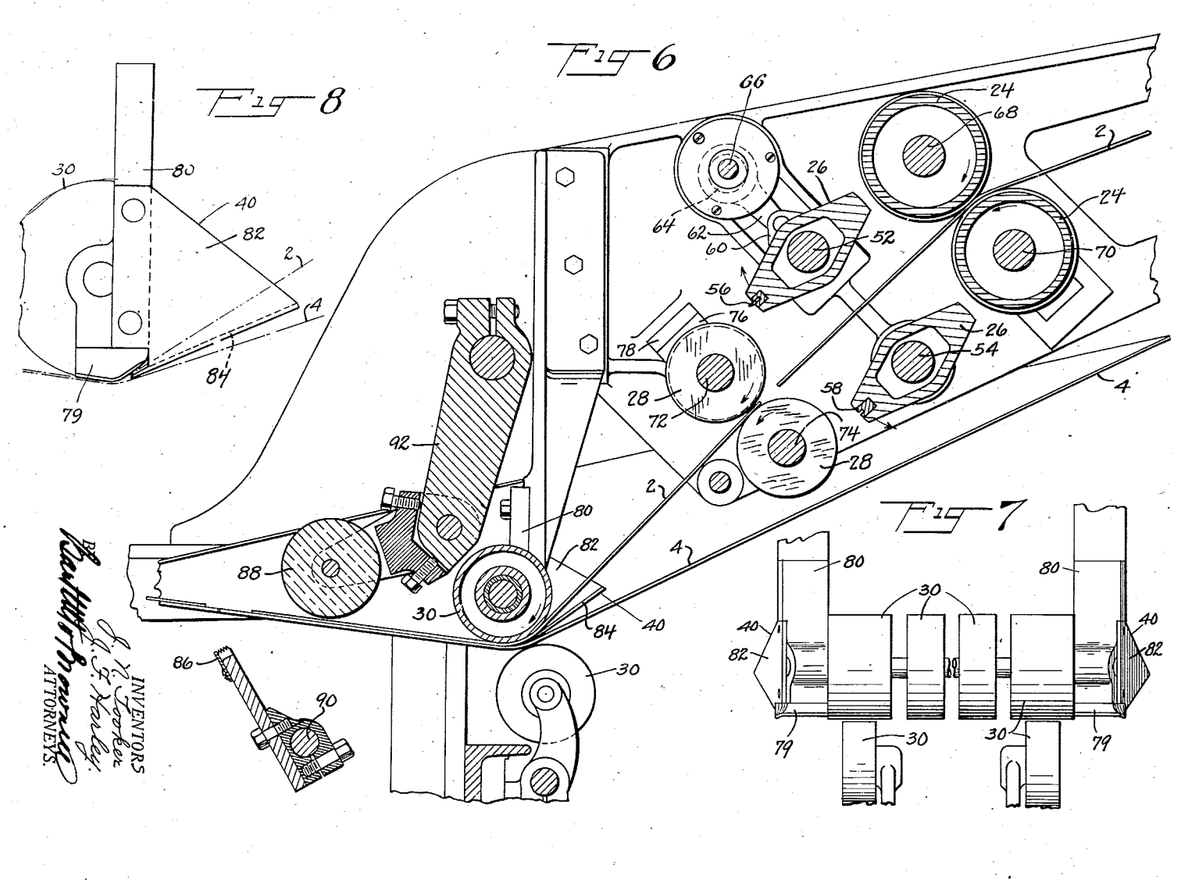
Fig. 6 is a longitudinal sectional view, on an enlarged scale, of a portion of the machine.
Fig. 7 is a detail front view of a portion of folding devices shown in Fig. 6.
Fig. 8 is a detail side view of a portion of the folding devices shown in Fig. 7.
Figure 11:
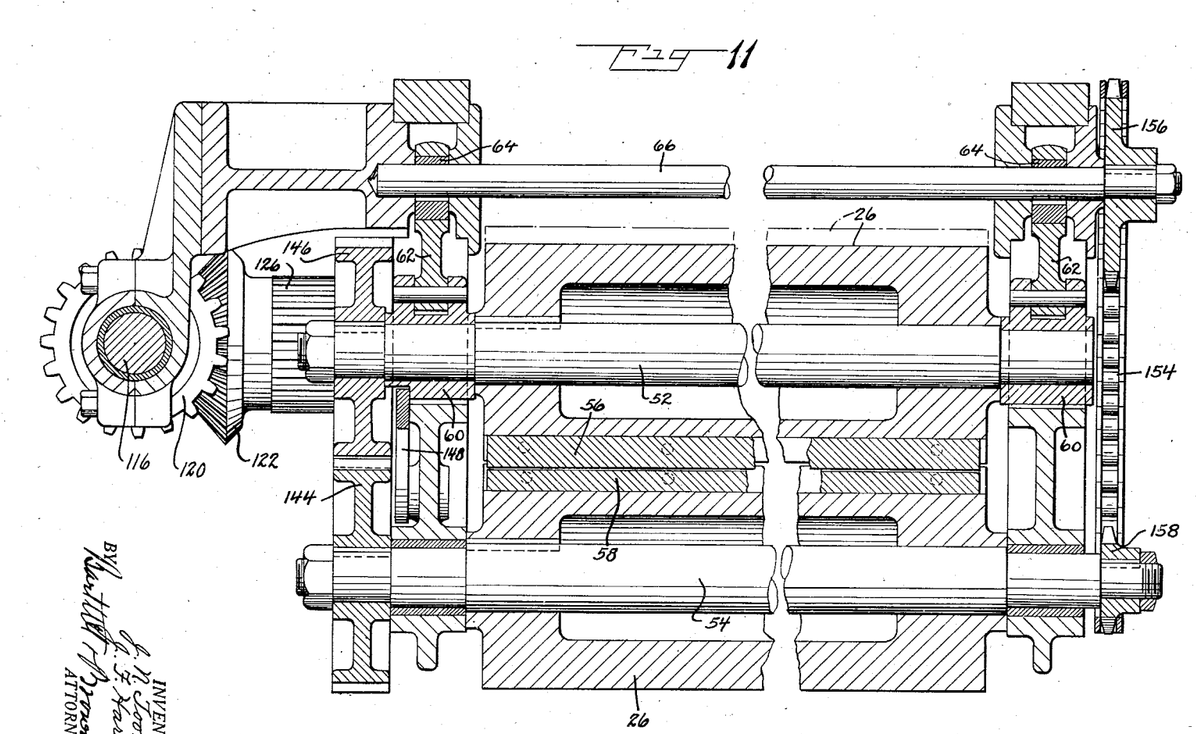
Figs. 11, 12 and 13 are sectional views, taken on the lines 11—11, 12—12 and 13—13, respectively, of Fig. 10.

The cutting-off rolls 26 for cutting off the inner ply blanks are carried by shafts 52 and 54 (Fig. 6), the upper roll being carried by the shaft 52 and having a knife blade 56 mounted thereon, and the lower roll 26 being carried by the shaft 54 and having a knife groove block 58 mounted thereon. The upper cutting-off roll 26 is moved toward and from the lower member in timed relation to the rotation thereof so as to cause its knife 56 to successfully cut off the blanks at the completion of each two revolutions thereof, the two rolls having opposed sides flattened to provide for clearance. To provide for such reciprocating movement of the upper roll 26, its shaft 52 has its ends journaled in vertically movable blocks 60 (Fig. 11) that are pivotally connected with the lower ends of rods 62, the upper ends of which surround eccentrics 64 carried by a driven shaft 66.

The draw rolls 24, which are carried by shafts 68 and 70, are driven at a slower speed than the rolls 28. As the tubular strip passes between the rolls 28, a certain amount of slippage of these rolls on the strip is permitted until a blank is cut off, whereupon these rolls act to feed the blank at a slightly greater speed than the speed of the advancing end of the tubular strip. This difference in speed of the two pairs of rolls is such as to result in the desired spacing of the blanks as they are cut off. The rolls 28 are made in sections so as to engage the tubular strip adjacent its longitudinal edges. The upper and lower rolls 28 are secured on shafts 72 and 74, respectively. The lower roll 28 is an idler and the ends of its shaft 74 are mounted in fixed bearings. The ends of the shaft 72 of the upper roll extend through journal blocks 76 that are mounted in suitable guideways in the machine frame so as to permit limited upward movement thereof, the blocks and consequently the upper roll 28 being pressed downwardly by means of rubber pads 78.

Figures 4, 5:
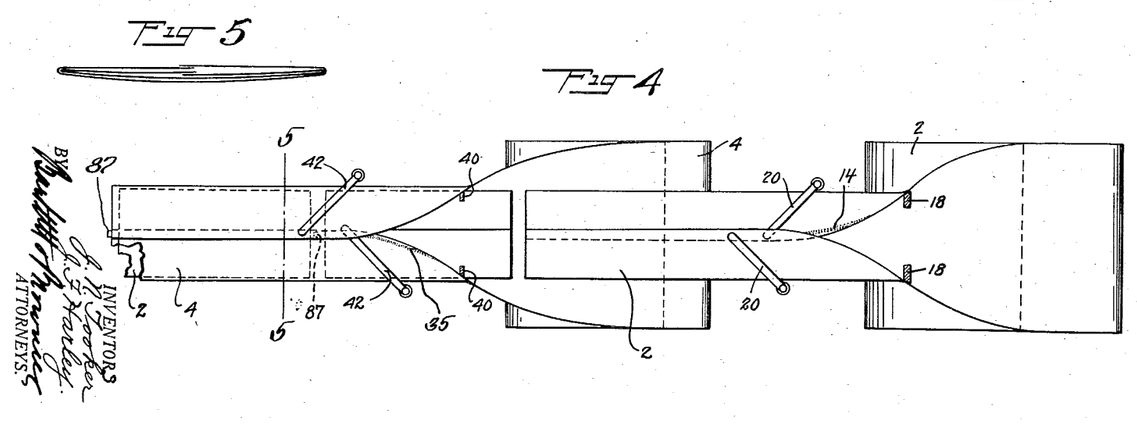
Fig. 4 is a detail plan view illustrating the manner in which the paper strips are folded and brought together in forming the inner and outer plies.
Fig. 5 is a detail sectional view taken on the line 5—5 of Fig. 4.

Before a blank is cut off from the end of the tubular strip 2, the end of the strip passes between the guide rolls 30 where it is presented to the outer strip 4, the cutting off of the blanks occurring after the end of the strip has passed some distance beyond these guide rolls. As the two strips approach their point of engagement, the folding devices 40 serve to cause the outer strip to be folded about the inner tubular strip (Figs. 4, 6, 7 and 8). These devices comprise sheet metal folders that are secured to shoes 79 which are secured to or formed on the lower ends of standards 80. The folders 40 have outwardly flaring side portions 82 and transverse lower portions 84 that extend beneath the lower ends of the shoes 79. The inner tubular strip 2 passes over the laterally extending portions 84 of the folders, beneath the shoes 79 and between the guide rolls 30. The outer strip 4 passes on the outside of the folders 40, and these folders cooperate with the folding fingers 42 to fold the outer strip about the inner tubular strip so that the blanks cut off from the latter are completely enclosed by the outer strip, the blanks being arranged in spaced relation as above described. The outer strip is folded about the inner strip with a sufficient degree of tightness so as to cause a certain amount of transverse bending of the inner strip as indicated in Fig. 5, but before the glue which secures the overlapping edges of the outer strip together becomes set and after the glue which secures the overlapping edges of the inner strip has become substantially set, the composite strip thus formed passes over the draw roll 44 which serves to flatten it, the unset glue permitting the upper folds of the outer strip to give sufficiently to permit this to be accomplished. It will be apparent that such folding operation insures the materials of the two strips being brought into intimate contact throughout.

After the two strips pass beyond the folding devices 40 and the guide rolls 30, the usual tab cutting device, comprising a U-shaped cutting blade 86 and a rubber cutting block or roll 88 (Figs. 3 and 6), acts to cut a tab 87 (Fig. 4) in the usual manner in the outer strip at a suitable point spaced between the adjacent ends of adjacent inner tubular blanks. As shown, the tab cutting blade 86 is mounted on a rotating shaft 90, and the cutting roll or block 88 is mounted on a suitable bracket 92 supported by the frame of the machine.

Figure 9:
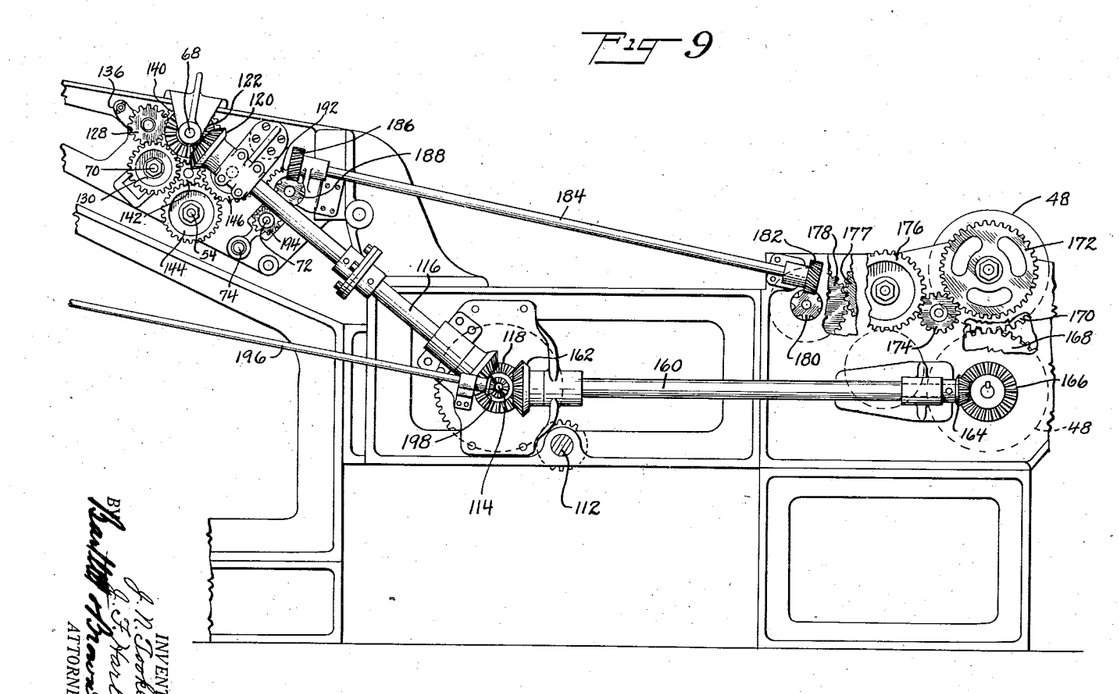
Fig. 9 is a left side view of a portion of the machine.

The cutting rolls 48 (Figs. 1 and 9) serve to successfully cut off the lengths of the composite tubular strip so as to form the completed blanks, the cuts being made so as to leave the projecting tabs 87 on the under side of the outer strip.

Figure 15:
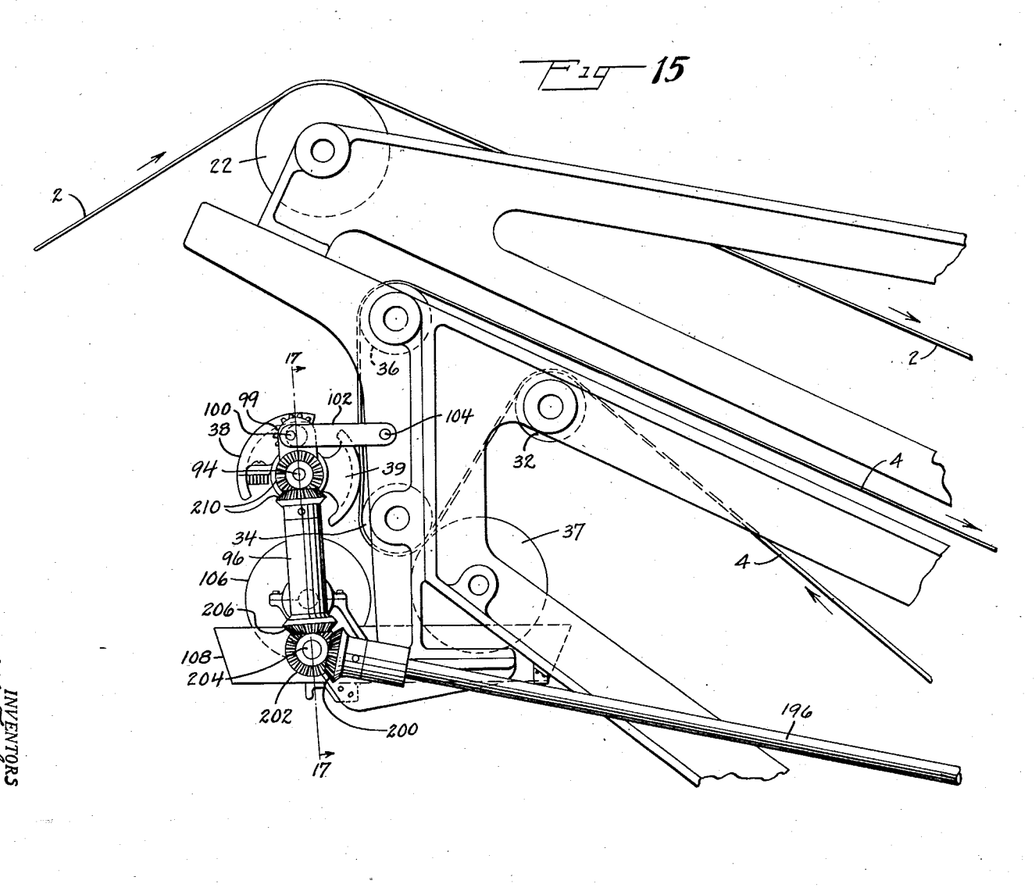
Fig. 15 is a left side elevation of a portion of the machine.
Figure 16:
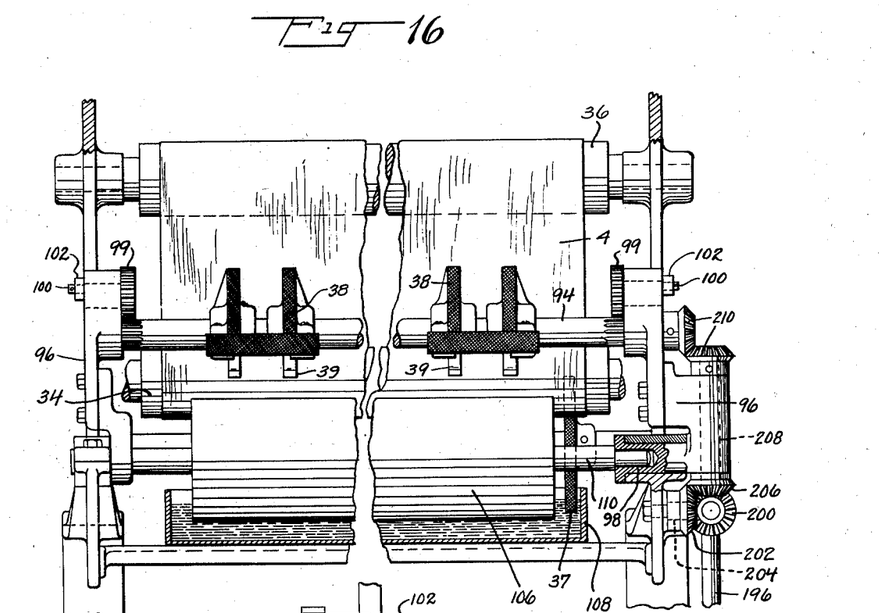
Fig. 16 is a front view, partly in section, of the portion of the machine shown in Fig. 15.
Figure 17:
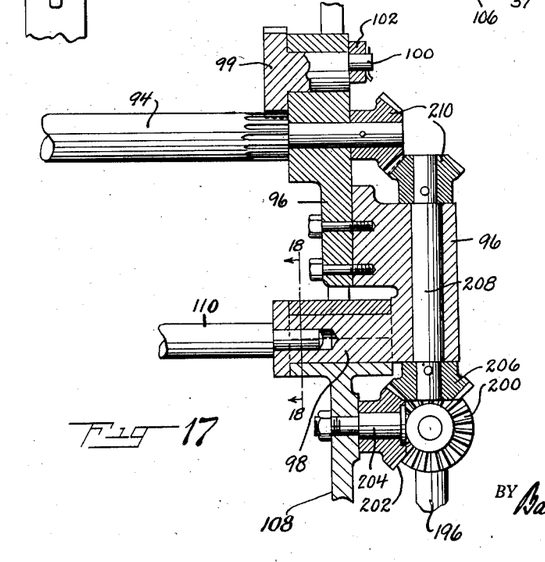
Fig. 17 is a detail sectional view, on an enlarged scale, taken on the line 17—17 of Fig. 15.
Figure 18:
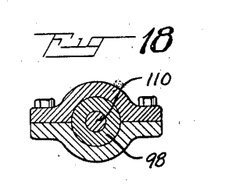
Fig. 18 is a detail sectional view taken on the line 18—18 of Fig. 17.

The two sets of glue applying segments 38 and 39, (Figs. 15, 16 and 17) hereinbefore referred to, are mounted on a shaft 94 which is rotated and is moved toward and from the feeding outer strip 4 in proper timed relation so as to cause the segments to apply the glue at the desired points on the strip, the segments 38 applying the glue at points on the strip that will constitute the forward end portions of the completed blanks, and the segments 39 applying glue at points that will constitute the rear portions of the completed blanks. To provide for such lateral movements of the shaft 94, the ends of the shaft are journaled in bearings in brackets 96 that are provided with inwardly projecting pivot studs 98 mounted in suitable bearings in the machine frame. Pinions 99, which have their shafts journaled in the upper ends of the brackets 96, mesh with pinion teeth on the ends of the shaft 94, and the outer ends of the shafts of the pinions 99 have eccentrically projecting pins 100. Links 102 are pivotally mounted at one end on the eccentric pins 100 and their other ends are pivotally mounted on pins 104 secured to the machine frame. Glue is applied to the surfaces of the segments 38 and 39 by means of a supply roll 106 which extends into a glue holding pan 108 and has the ends of its shaft 110 mounted in sockets in the pivot studs 98.

Figure 12:
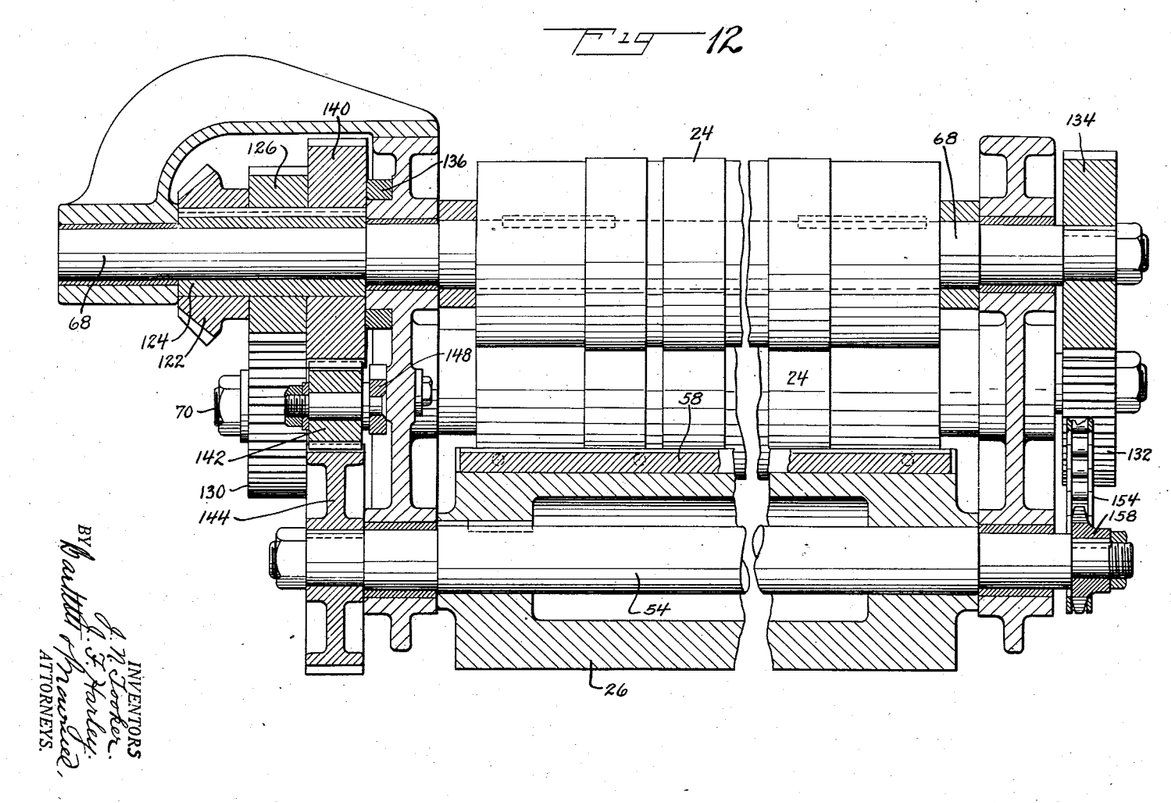

The machine is driven from a drive shaft 112 (Fig. 9) which through suitable gearing drives the main shaft 114. The driving connection between the main shaft 114 and the pinch or draw rolls 24 comprises an inclined shaft 116 (Fig. 10) having a bevel gear at one end that is engaged by a bevel gear 118 carried by the shaft 114. The other end of the shaft 116 carries a bevel gear 120 that engages a bevel gear 122 secured on a sleeve 124 (Fig. 12) that is loosely mounted on the upper draw roll carrying shaft 68. The sleeve 124 carries a spur gear 126 which, through an idler gear 128, drives a spur gear 130 that is secured on one end of the shaft 70 which carries the lower draw roll 24. The other end of the shaft 70 carries a spur gear 132 (Figs. 1 and 12) which engages a corresponding gear 134 secured on the shaft 68 that carries the upper draw roll 24. The idler 128 is mounted on an arm 136 which has one end pivotally mounted on the machine frame axially of the draw roll shaft 68 so as to permit adjustment of the gear 128 about its driving gear 126, the arm 136 being held in adjusted position by means of a clamping bolt 138 which extends through a slot in the machine frame. The provision for such adjustment of the idler gear 128 about the axis of the draw roll shaft 68, permits different size gears 130 to be secured on the draw roll shaft 70 so as to permit the speed of rotation of the feed rolls to be varied with relation to the other operating parts of the machine.

Figures 13, 14:
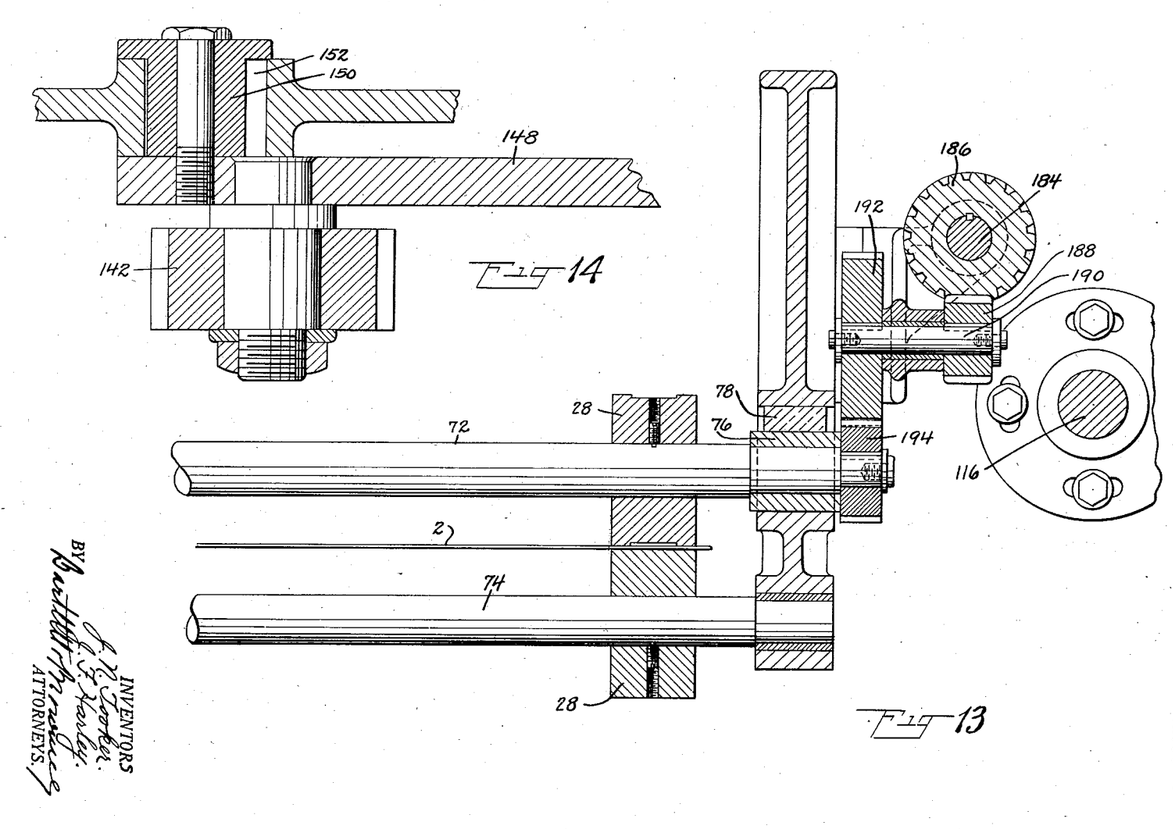
Fig. 14 is a detail sectional view, on an enlarged scale, taken on the line 14—14 of Fig. 10.

The cutting-off rolls 26 for the inner strip, are also driven through connection with the driving sleeve 124. This connection comprises a spur gear 140 carried by the sleeve which, through an idler pinion 142, drives a spur gear 144 secured on one end of the shaft 54 that carries the lower cutting-off roll 26. The gear 144 engages a corresponding gear 146 secured on the shaft 52 that carries the upper cutting-off roll 26. This gear 146 is also engaged by the driving spur gear 140. In order to allow for the vertical reciprocating movement of the upper cutting-off roll 26 as above described, the idler pinion 142 is mounted on a lever 148 (Fig. 14) which has one end pivotally connected with one of the journal blocks 60 in which one end of the shaft 52 is journaled, and the other end of the lever has a pivot block 150 secured thereto which extends through an elongated guide slot 152 in the machine frame. With this construction, during the upward movement of the upper cutting-off roll 26, the gear 146 is raised out of engagement with the gear 144 but the gear 146 will continue to be driven by the driving spur gear 140 and the gear 144 will, of course, continue to be driven by the pinion 142. During the downward movement of the upper cutting-off roll 26, the gear 146 will again be brought into mesh with the gear 144. It may be noted, as both gears 146 and 144 are at all times in operative engagement with the driving gear 144 that proper re-engagement of the teeth of the gear 146 with the teeth of the gear 144 is ensured.

The shaft 66 which carries the eccentrics 64 is driven by a sprocket chain 154 (Figs. 1 and 11) that passes over a sprocket wheel 156 secured on said shaft, and a sprocket wheel 158 secured on the lower cutting roll shaft 54.

Figure 10:
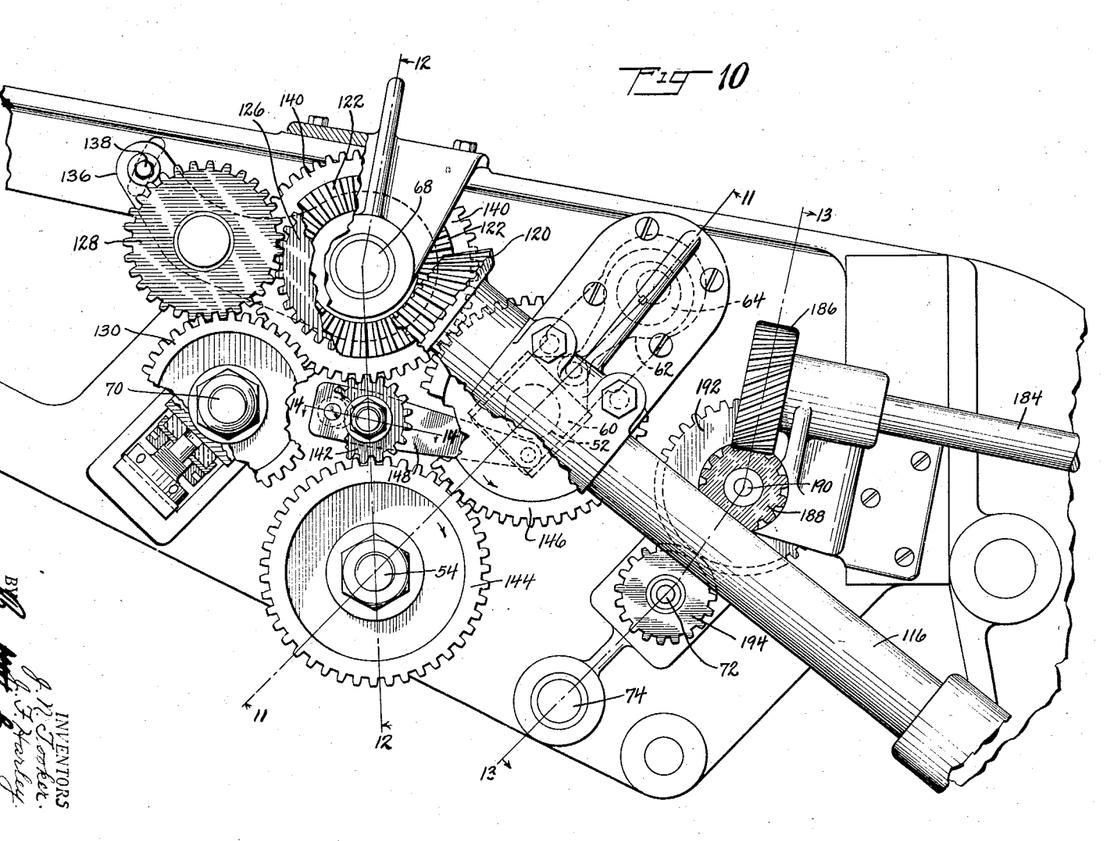
Fig. 10 is a detail view, on an enlarged scale, corresponding to a portion of Fig. 9.

The connection between the main shaft 114 and the cutting-off rolls 48 (Figs. 1 and 9) comprises a horizontal shaft 160 having one end provided with a bevel gear 162 that is engaged by the bevel driving gear 118, and having its other end provided with a bevel pinion 164 that engages a gear 166 secured on one end of the lower cutting roll shaft. This roll shaft carries a spur gear 168 that engages a gear 170 on the shaft that carries the upper cutting-off roll 48. The latter shaft carries a spur gear 172 which, through an idler 174, drives a gear 176 secured on the shaft of the upper pinch or draw roll 46. A gear 177 secured on the latter shaft engages a gear 178 secured on the shaft of the draw roll 44. The shaft of the draw roll 44 carries a skew pinion 180 that engages a pinion 182 on the forward end of an inclined shaft 184. The rear end of this shaft 184 carries a skew pinion 186 that engages a pinion 188 on a counter-shaft 190 (Fig. 10). This counter-shaft 190 carries a spur gear 192 (Fig. 13) which operatively engages a gear 194 secured on the shaft 72 that carries the draw roll 28.

The connection between the main shaft 114 and the shaft 94 that carries the gluing segments 38 and 39, comprises an inclined shaft 196 (Figs. 9 and 15) that is connected at one end by bevel pinions 198 with the main shaft, and its other end (Figs. 15, 16 and 17) carries a bevel pinion 200 which engages a pinion 202 loosely mounted on a stud shaft 204 secured to the glue pan bracket 108. The bevel pinion 202 engages a pinion 206 secured on the lower end of a counter-shaft 208 which extends through a suitable bearing on the swinging bracket 96. The upper end of the counter-shaft 208 is in driving connection with the shaft 94 through bevel gears 210.

The provision for varying the speed of the main draw rolls 24 for the inner strip independently of the other parts of the driving mechanism, as above described, permits the spacing of the blanks as they are cut off from the inner strip to be varied as desired. Also by suitably adjusting the several folding devices, the machine may be made to form bag blanks of different widths.

From the foregoing it will be apparent that our improved machine is capable of performing the several operations necessary to form the bag blanks in accordance with our improved method uniformly, rapidly and continuously. In the drawings the overlapping folds or seams of the plies are shown overlying, but it will be apparent that by merely offsetting one or both of the supply rolls for the strip with relation to each other, the seams of the plies may be spaced apart as may be desired. In forming the blanks for the bag of our said Patent No. 1,633,296 by the above described machine and method the tube lengths, cut off from the inner strip, are uniformly applied to the outer strip in uniform spaced relation which insures that the ends of the inner and outer tubes of the completed bag blanks shall be properly spaced to provide the desired shingle effect. The inner tubes are securely glued at their ends to the outer tubes, and intimate contact of the materials of the inner and outer tubes throughout is insured.

While the method and machine disclosed herein are particularly adapted for use in the manufacture of multi-ply bags of the type of our said patented bag, it will be apparent that certain features of our invention are well adapted for use in the manufacture of multi-ply bags of various other types, whether or not the ends of the inner ply or plies of the bags are spaced from the outer ply or plies. It will also be apparent that our invention permits various other modifications to be made without departing from the spirit thereof or the scope of the appended claims.

What we claim is:

1. The improvement in the method of manufacturing bag tubes of the class described which comprises, feeding two strips longitudinally, and while the strips are being fed progressively positioning the longitudinal edges of one of the strips together to form a tube, and progressively positioning the longitudinal edges of the other strip together so as to enclose the tube thus formed, the second mentioned strip being thus positioned about the first mentioned strip a distance in advance of the point in the first strip where the tube is completely formed.

2. The improvement in the method of manufacturing bag tubes of the class described which comprises, feeding a strip longitudinally, progressively folding the strip on lines parallel with its edges so as to position its edge portions in overlapping relation to form a flattened tube while the strip is being fed, and feeding another strip longitudinally and progressively folding it about the tube thus formed, the second mentioned strip being folded about the first mentioned strip a distance in advance of the point in the first strip where the tube is completely formed.

3. The improvement in the method of manufacturing bag tubes of the class described which comprises, folding a strip on lines parallel with its longitudinal edges so as to position its edge portions in overlapping relation to form a flattened tube, securing its overlapping portions together, positioning the longitudinal edges of another strip together in overlapping relation so as to enclose the flattened tube with sufficient tightness to cause said tube to bend slightly transversely thereof, securing the overlapping edges of the second mentioned strip together by means of adhesive, and before said adhesive has become set flattening the composite strip so as to cause the materials of the strips to closely engage each other.

4. The improvement in the method of manufacturing bag tubes of the class described which comprises, feeding two strips longitudinally, folding one of the strips as it is being fed to form a tube, cutting off predetermined lengths of the tube thus formed and successively presenting them in spaced relation to one side of the other strip, folding the latter strip about said tube lengths as they are presented thereto, and successively cutting off lengths of the composite strip between the adjacent ends of said inner tube lengths.

5. The improvement in the method of manufacturing bag tubes of the class described which comprises, feeding two strips longitudinally, folding one of the strips as it is being fed to form a tube, cutting off predetermined lengths of the tube thus formed and successively presenting them in spaced relation to one side of the other strip, securing said tube lengths to said other strip by means of adhesive, and folding the latter strip about said tube lengths as they are presented thereto.

6. The improvement in the method of manufacturing bag tubes of the class described which comprises, feeding two strips longitudinally, folding one of the strips as it is being fed to form a tube with the edges of the tube overlapping, securing said overlapping edges together, cutting off predetermined lengths of the tube thus formed and successively presenting them in spaced relation to one side of the other strip, securing said tube lengths to the outer strip by means of adhesive, folding said other strip about said tube lengths as they are presented thereto with the edges of the outer strip overlapping, securing said overlapping edges of the outer strip together by means of adhesive, and successively cutting off lengths of the composite strip between the adjacent ends of said inner tube lengths.

7. A machine for use in the manufacture of bag tubes of the class described having, in combination, means for feeding two strips longitudinally, devices for progressively folding one of the strips longitudinally to form a tube, and devices for progressively folding the other strip so as to enclose the tube thus formed, the second mentioned strip being folded about the first mentioned strip a distance in advance of the point in the first strip where the tube is completely formed.

8. A machine for use in the manufacture of bag tubes of the class described having, in combination, means for feeding a strip longitudinally, devices for folding the strip on lines parallel with its edges so as to position progressively its edge portions in overlapping relation to form a flattened tube while the strip is being fed, and means for feeding another strip longitudinally and progressively folding it about the tube thus formed, the second mentioned strip being folded about the first mentioned strip a distance in advance of the point in the first strip where the tube is completely formed.

9. A machine for use in the manufacture of bag tubes of the class described having, in combination, means for feeding a strip longitudinally, devices for folding the strip on lines parallel with its edges so as to position its edge portions in overlapping relation to form a flattened tube while the strip is being fed, means for feeding another strip longitudinally, devices for positioning the longitudinal edges of the second mentioned strip together in overlapping relation so as to enclose the tube thus formed with sufficient tightness to cause said tube to bend slightly transversely thereof, means for applying adhesive to one of the longitudinal edges of the second mentioned strip so that said edges will adhere when they are brought together, and devices acting before said adhesive has become set to flatten the composite tube thus formed so as to cause the materials of the tubes to closely engage each other.

10. A machine for use in the manufacture of bag tubes of the class described having, in combination, means for feeding two strips longitudinally, devices for folding one of the strips as it is being fed to form a tube, devices for cutting off predetermined lengths of the tube thus formed and successively presenting them in spaced relation to one side of the other strip, devices for folding the latter strip about said tube lengths as they are presented thereto, and devices for successively cutting off lengths of the outer tube between the adjacent ends of said inner tube lengths.

11. A machine for use in the manufacture of bag tubes of the class described having, in combination, means for feeding two strips longitudinally, devices for folding one of the strips as it is being fed to form a tube, devices for cutting off predetermined lengths of the tube thus formed and successively presenting them in spaced relation to one side of the other strip, means for applying adhesive to said side of said other strip so as to cause said tube lengths to adhere thereto, and devices for folding the latter strip about said tube lengths as they are presented thereto.

12. A machine for use in the manufacture of bag tubes of the class described having, in combination, means for feeding two strips longitudinally, devices for folding one of the strips as it is being fed to form a tube with the edges of the tube overlapping, means for applying adhesive to at least one of said edges so as to cause said edges to adhere when they are brought together, devices for cutting off predetermined lengths of the tube thus formed and successively presenting them in spaced relation to one side of the other strip, means for applying adhesive to said side of said other strip, devices for folding said other strip about said tube lengths as they are presented thereto with the edges of the outer strip overlapping, means for applying adhesive to at least one of said edges of the outer strip so as to cause said edges to adhere when they are brought together, and devices for successively cutting off lengths of the outer tube between the adjacent ends of said inner tube lengths.

13. A machine for use in the manufacture of bag tubes of the class described having, in combination, means for feeding two strips longitudinally in superposed relation with the upper strip fed at a lesser speed than the lower strip, said feeding means having provision for varying the relative speed of travel of the two strips, devices for folding the upper strip as it is being fed to form a tube, devices for cutting off predetermined lengths of the tube thus formed and successively presenting them to one side of the lower strip, said tube lengths being presented in spaced relation due to the difference in the rate of feed of the two strips, and devices for folding the lower strip about said tube lengths.

14. A machine for use in the manufacture of bag tubes of the class described having, in combination, means for feeding a strip longitudinally, means for feeding another strip longitudinally and at a slower speed than the first mentioned strip is fed comprising two sets of feed rolls, one set being rotated at substantially the same surface speed as the strip is fed and the other set being arranged in front of the first set and tending to feed the strip at substantially the same speed as said first mentioned strip is fed, devices arranged between said two sets of feed rolls for successively cutting off predetermined lengths of the second mentioned strip, and means for successively presenting said cut off lengths to the first mentioned strip.

15. A machine for use in the manufacture of bag tubes of the class described having, in combination, means for feeding a strip longitudinally, means for feeding another strip longitudinally at a slower speed than the first mentioned strip is fed comprising two sets of feed rolls, one set being rotated at substantially the same surface speed as the strip is fed and the other set being arranged in front of the first set and tending to feed the strip at substantially the same speed as the first mentioned strip is fed, devices arranged between said two sets of feed rolls for successively cutting off predetermined lengths of the second mentioned strip, and means for successively presenting said cut off lengths to the first mentioned strip, and devices for cutting off the second mentioned strip between the adjacent ends of the cut off lengths of the other strip.

16. The improvement in the method of manufacturing bag tubes of the class described which comprises feeding two strips longitudinally, folding one of the strips as it is being fed to form a flattened tube with the edges of the tube overlapping, securing said overlapping edges together by means of adhesive, cutting off predetermined lengths of the tube thus formed and successively presenting them in spaced relation to one side of the other strip, folding the latter strip about said tube lengths with sufficient tightness to cause said tube lengths to bend slightly transversely thereof, securing the overlapping edges of the second mentioned strip together by means of adhesive, and before said adhesive on the edges of the second strip has become set, flattening the composite strip so as to cause the materials of the strip to closely engage each other.

17. The improvement in the method of manufacturing bag tubes of the class described which comprises feeding a strip longitudinally, progressively folding the strip on lines parallel with its edges so as to position its edge portions in overlapping relation to form a flattened tube while the strip is being fed, securing said overlapping edge portions together by means of adhesive, feeding another strip longitudinally and progressively folding it about the tube thus formed at a distance in advance of the point in the first strip where the tube is completely formed, the second mentioned strip being folded with sufficient tightness to cause the enclosed tube to bend slightly transversely thereof, securing the overlapping edges of the second mentioned strip together by means of adhesive, and before said adhesive on the edges of the second strip has become set, flattening the composite strip so as to cause the materials of the strips to closely engage each other.

In testimony whereof, we have signed our names to this specification this 7th day of December, 1927.

JOHN N. TOOKER.
JOHN F. HARLEY.